J. WINGEN.
GRATE FOR GAS PRODUCERS.
APPLICATION FILED JAN. 31, 1913.
1,173,693.
Patented Feb. 29, 1916.
2 SHEETS—SHEET 1.
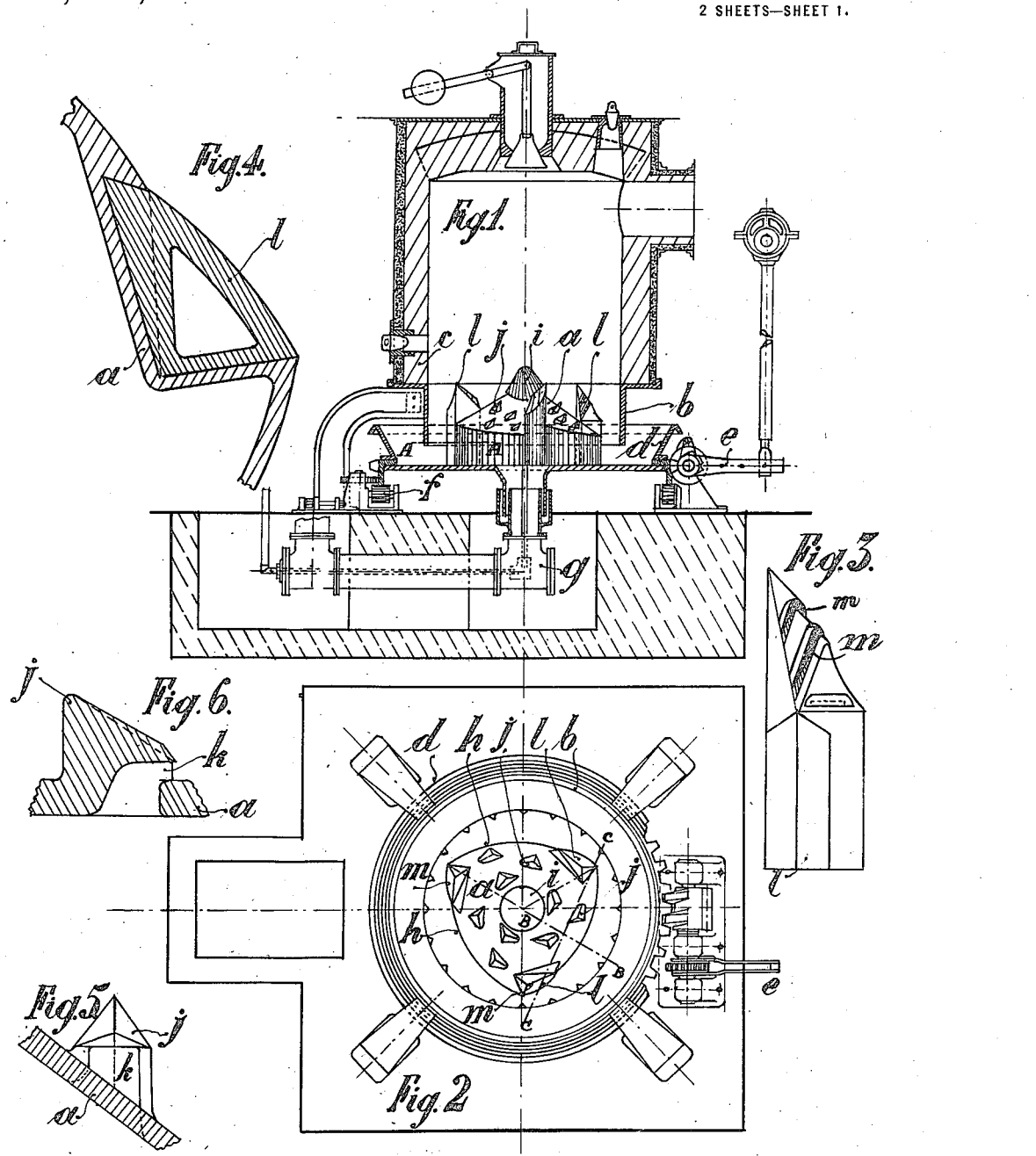

J. WINGEN.
GRATE FOR GAS PRODUCERS.
APPLICATION FILED JAN. 31, 1913.
1,173,693.
Patented Feb. 29, 1916.
2 SHEETS—SHEET 2.
Fig. 7.
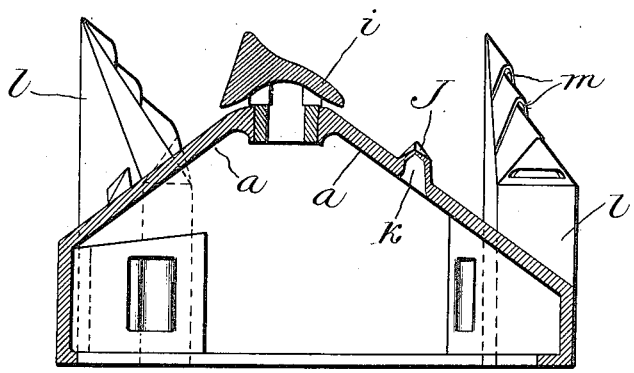
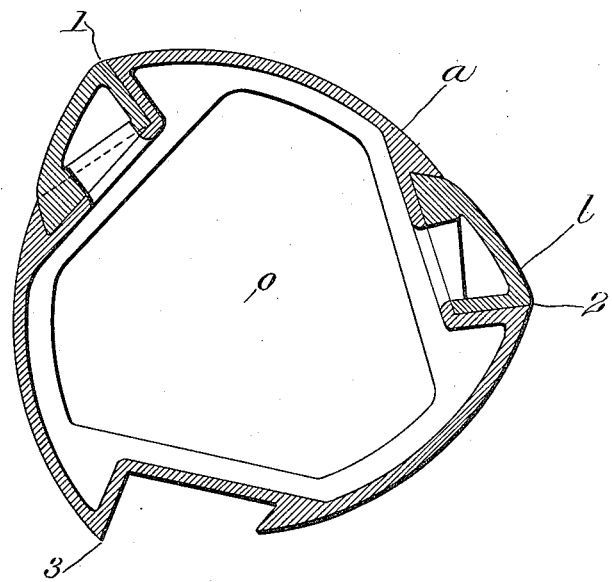
Fig. 8.

UNITED STATES PATENT OFFICE.

JEAN WINGEN, OF LIEGE, BELGIUM.

GRATE FOR GAS-PRODUCERS.

1,173,693.

Specification of Letters Patent. Patented Feb. 29, 1916.

Application filed January 31, 1913. Serial No. 745,498.

*To all whom it may concern:*

Be it known that I, JEAN WINGEN, subject of the King of Belgium, residing at Liege, Belgium, have invented certain new and useful Improvements in Grates for Gas-Producers, of which the following is a specification.

The object of the present invention is to provide a rotary grate for gas producers, which is provided with a number of projections or prongs in the form of shares and preferably carried by a conical base. These prongs in consequence of this formation, produce a continual disintegration of the fuel, by breaking up the same and forcing it radially both toward the center and toward the periphery of the furnace. This arrangement thereby prevents the agglomeration of the fuel, does not cause the fuel that lies upon the grate to be carried around, and assists the passage and uniform distribution of the air entering at the base.

The accompanying drawings represent, by way of example, a gas producer provided with the above form of grate.

Figure 1 is a vertical section. Fig. 2 is a top-side plan. Fig. 3 shows upon an enlarged scale, a rear view of one of the prongs or shares detached. Fig. 4 is a horizontal section through one of the prongs, on the line A—A of Fig. 1, upon an enlarged scale. Fig. 5 is a vertical radial section, on the line B—B of Fig. 2, showing one of the small projections provided upon the surface of the grate. Fig. 6 is a vertical transverse section on the line C—C of Fig. 2. Fig. 7 is a vertical sectional view on an enlarged scale of the grate. Fig. 8 is a horizontal sectional view through the grate on the same scale as Fig. 7.

The conical grate $a$, which is surrounded by the cylindrical ring $b$ of the generator $c$, is carried by a trough $d$, to which is imparted by suitable mechanism $e$, a continual rotary movement. The whole mechanism rests upon rollers or balls $f$ and it is connected in the usual manner to the fixed conduit $g$, which conveys the compressed air and the water through a hydraulic joint.

The conical grate $a$ is formed with a triangular base $h$ preferably having unequal sides; it carries at its apex a cap $i$, beneath which is created a draft of air, and all over its upper face it carries triangular projections $j$ which are shaped as shown in Figs. 5 and 6, and have openings $k$ constituting air inlets.

The grate is provided with prongs $l$, which as shown are of substantially triangular form in horizontal cross section above the body of the grate, having their longest diameter extending in the direction of rotation of the grate. The top surface of each prong $l$ has a downward inclination from its pointed end or apex and said top surface also is inclined in the opposite directions from a longitudinal center line. The prongs $l$ are preferably situated at unequal distances from the center and particularly arranged at the corners of the triangular base, so that the said prongs, contrary to the arrangements already known, do not force the fuel before them, but divide and break the same and force it radially, both toward the center and toward the periphery of the producer. As shown in Fig. 8 the body of the prong $l$ at the right hand side of the figure extends at the point 2 farther from the center $o$ of the grate than the corresponding points 1, 3, of the other prongs. The prongs are preferably thus arranged so that they do not all follow absolutely the same path through the material on the grate. During the rotation of the grate a continuous disintegration of the fuel is produced, and a regular distribution of the air over the whole of the surface of the furnace and a complete elimination of the ashes and clinkers is effected. The prongs $l$ are also provided with openings $m$ which convey the air to the producer and they are arranged so that they may be easily detached from the grate $a$ through the opening in the hopper of the producer. In the example shown in Fig. 4, they are formed with dove-tailed parts which fit into the grate, so that no bolts are required for any portion of the grate.

As in consequence of the particular arrangement of the grate, the interchangeable prongs or shares are the only parts which are likely to deteriorate or become burnt, the durability of same is considerably increased.

Having fully described my invention what I desire to claim and secure by Letters Patent is:—

1. A revoluble grate for a gas producer comprising a body of conical form having a plurality of peripherally arranged, upwardly projecting, members, elongated in the direction of rotation of the grate and each adapted to break up the mass of fuel through which it passes and to force the separated parts toward both the center and periphery of the grate.

2. A revoluble grate for a gas producer comprising a body of conical form having a plurality of peripherally arranged, upwardly projecting, members, elongated in the direction of rotation of the grate and extending different distances from the axis of the grate, each of said members being adapted to break up the mass of fuel through which it passes and to force the separated parts toward both the center and periphery of the grate.

3. A revoluble grate for a gas producer comprising a body of conical form having a plurality of peripherally arranged, upwardly projecting, hollow members, elongated in the direction of the rotation of the grate and each adapted to break up the masses of fuel through which it passes and to force the separated parts toward both the center and periphery of the grate, each of said members being formed with passages to permit air to pass outwardly from the interior thereof.

4. A revoluble grate for a gas producer comprising a body of conical form having thereon a series of relatively short projections $j$ each provided with an air passage that opens through a side wall above the main surface of the grate, and a plurality of peripherally arranged members of greater height, each of substantially triangular form in horizontal cross section, with the apex pointing in the direction of rotation of the grate, adapted to deflect the mass of fuel through which they pass toward the center and periphery of the grate.

5. A revoluble grate for a gas producer comprising a body of conical form having thereon a series of relatively short projections $j$, each provided with an air passage that opens through a side wall above the main surface of the grate, and a plurality of peripherally arranged members of greater height each of substantially triangular form in horizontal cross section, with the apex pointing in the direction of rotation of the grate, the top surface of each peripheral member being inclined downward from said apex and also in opposite direction from a longitudinal central line, whereby the fuel through which it passes will be deflected toward both the center and periphery of the grate.

In testimony whereof I have hereunto set my hand in presence of two subscribing witnesses.

JEAN WINGEN.

Witnesses:
H. CORNÉLIS,
L. R. HEINGARTNER.